United States Patent [19]

Gammon

[11] Patent Number: 4,461,091
[45] Date of Patent: Jul. 24, 1984

[54] PLUMB BOB

[75] Inventor: Norman P. Gammon, San Francisco, Calif.

[73] Assignee: Gammon Reel, Inc., San Francisco, Calif.

[21] Appl. No.: 387,374

[22] Filed: Jun. 11, 1982

[51] Int. Cl.³ .............................................. G01C 15/10
[52] U.S. Cl. ................................................... 33/392
[58] Field of Search ................ 33/398, 332, 392, 393, 33/394, 391, 365, 369

[56] References Cited

U.S. PATENT DOCUMENTS

| | | | |
|---|---|---|---|
| 2,381,698 | 8/1945 | Sireci | 33/392 |
| 2,492,884 | 12/1949 | Patermaster | 33/392 |
| 2,594,823 | 4/1952 | Suverkrop | 33/392 |
| 2,621,421 | 12/1952 | Owens | 33/393 |
| 2,791,037 | 5/1957 | Damron | 33/392 |

FOREIGN PATENT DOCUMENTS

| | | | |
|---|---|---|---|
| 614735 | 12/1948 | United Kingdom | 33/393 |
| 1320677 | 6/1973 | United Kingdom | 33/392 |

*Primary Examiner*—William D. Martin, Jr.
*Attorney, Agent, or Firm*—Phillips, Moore, Lempio & Finley

[57] ABSTRACT

A plumb bob is disclosed that consists of a relatively low-density plastic frustoconical outer shell formed about a relatively high density metallic core. The plumb bob includes a conical support collar at its smaller end, the collar defining an axial bore for receiving either a threaded conventional plumb bob point or a conventional concrete nail. At its other end, the plumb bob defines a smooth curved surface forming a knobbed extension leading to an axial bore for fixing the supporting string. This smooth curve of the knobbed extension prevents undue wear to the supporting string when the plumb bob is in use. The construction of the plumb bob is such that the outer shell and the knobbed extension may be made of impact resistant polycarbonate plastic having a high visibility color.

21 Claims, 7 Drawing Figures

U.S. Patent  Jul. 24, 1984  Sheet 1 of 2  4,461,091
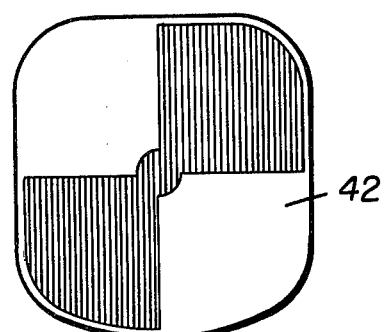
FIGURE 1
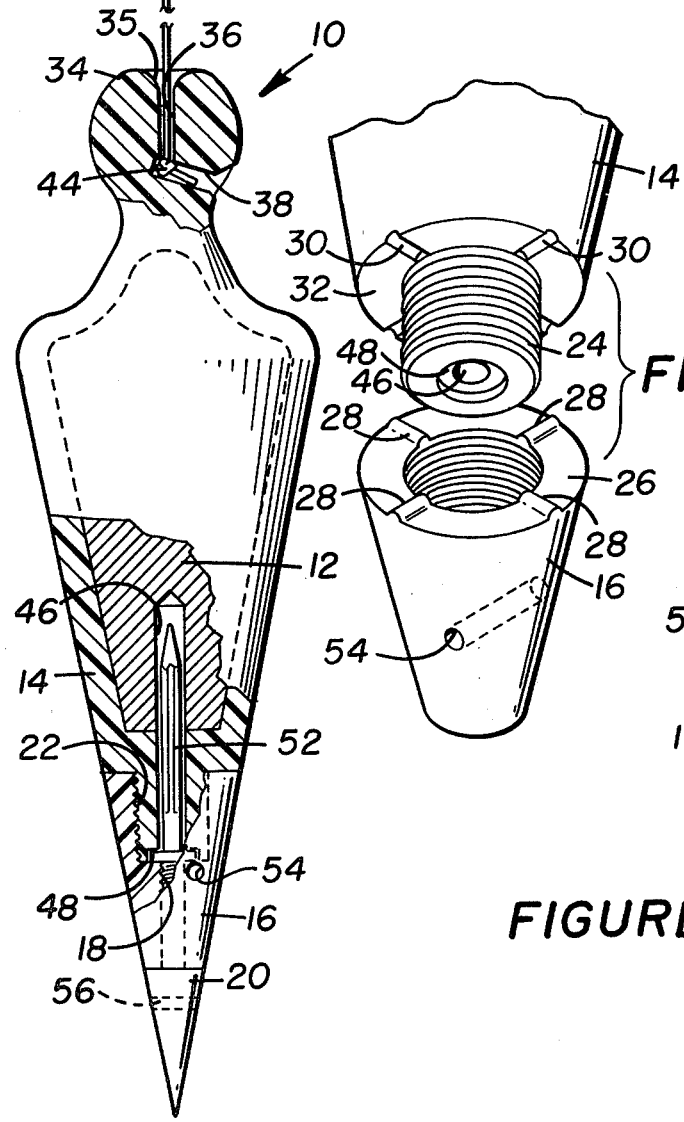
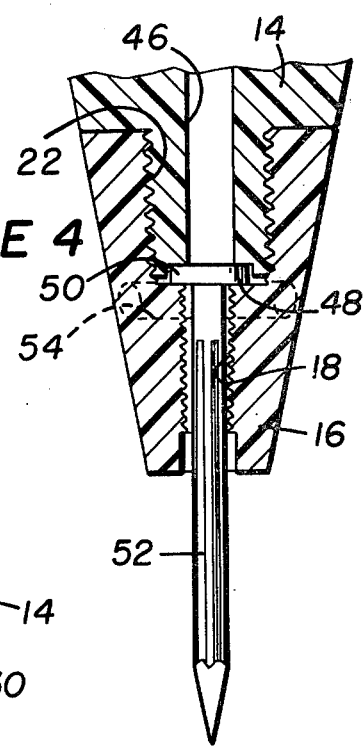
FIGURE 4
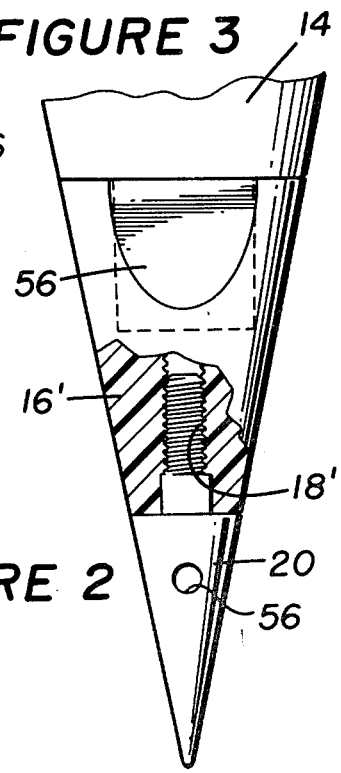
FIGURE 2
FIGURE 3

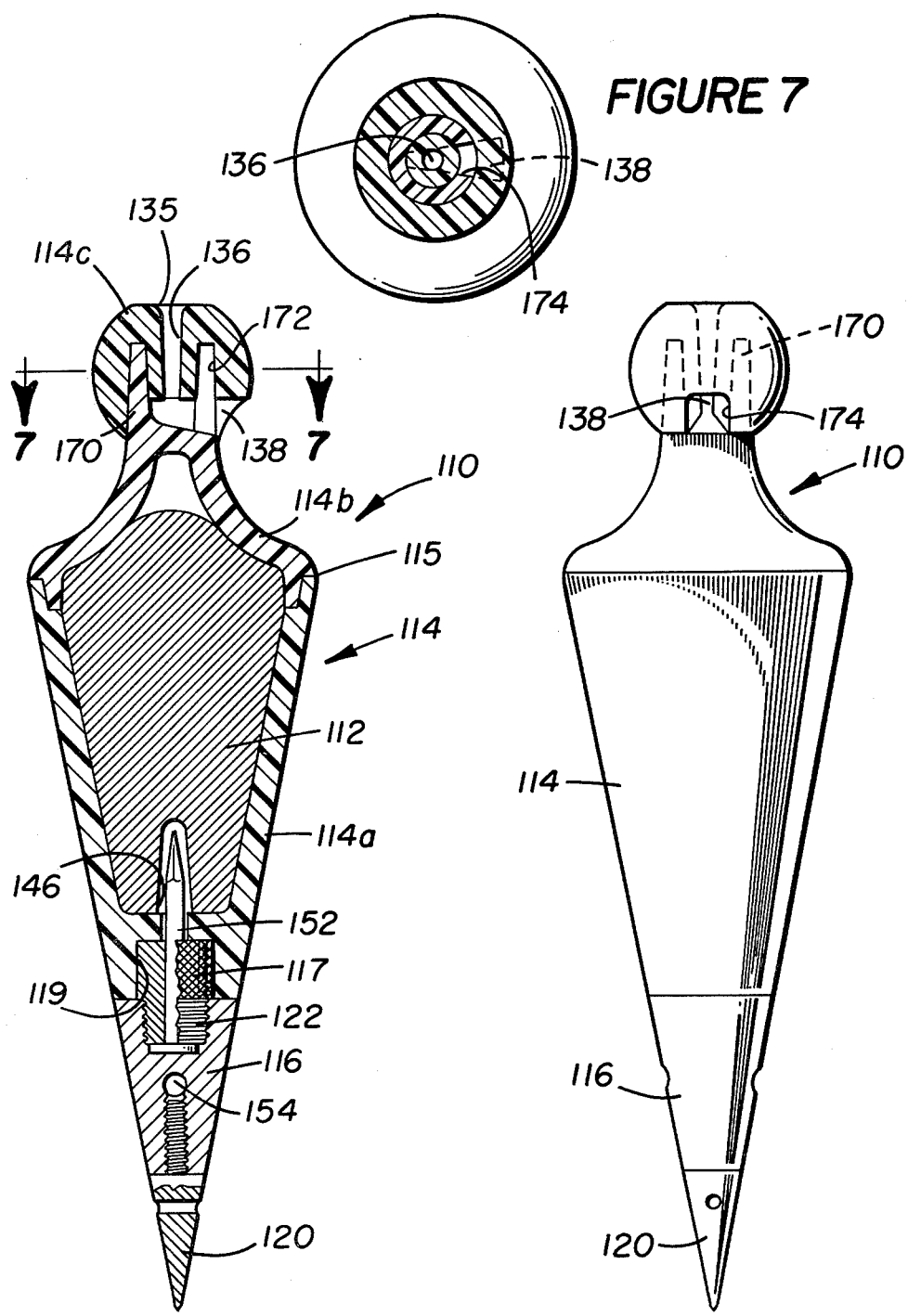

PLUMB BOB

TECHNICAL FIELD

This invention relates generally to plumbing devices and more particularly to plumb bobs as used in both surveying and in the construction field.

BACKGROUND ART

The establishment of a vertical reference above an obscure datum by a surveyor or for a construction worker to transfer a datum vertically from one level to another are everyday requirements in the surveying and construction fields. One of the most common items to accomplish these functions is the plumb bob. A plumb bob comprises a weight affixed to a flexible member such as a string so that the string may be held vertically above a reference point or datum. The string, therefore, becomes an extension of the reference point or datum that is located underneath the weighted end of the string. In order to increase the accuracy of such a system, the weight has for many years been made in a conical shape. Representative of such a device is the plumb bob described in U.S. Pat. No. 2,381,698 issued on Aug. 7, 1949 to G. Sireci. Plumb bobs such as the Sireci plumb bob have traditionally been made of metal, usually brass. In recent years, some plumb bobs have reached the field made of some other metal, with a chromium outer surface.

When a surveyor utilizes a plumb bob, the rod man or the chain man suspends the plumb bob by the string so that the pointed end of the plumb bob is directly over the datum. The instrument man, when using a transit, will ideally sight in at the lower end of the plumb bob if it is visible; however, sighting on the string or an associated target located on the center line of the string may suffice if either the datum or plumb bob is not visible. The purpose of sighting in on the pointed end of the plumb bob itself is to ensure greater accuracy. With traditional brass plumb bobs, the surveyor may have difficulty seeing the plumb bob itself should there be vegetation or other material of a similar color in the vicinity of the datum. The use of a chromium plated plumb bob could, in part, overcome this problem; however, reflections from the chromium-plated plumb bob, when received in the magnifying telescope of the transit, could cause serious injury to the eye of the surveyor. Accordingly, it is appropriate to make a plumb bob of a high visibility non-reflective material so that it is easy to see at a distance. It should also be noted that the high visibility material facilitates locating a plumb bob if it is dropped in high grass or in some other obscure place.

In the past, plumb bobs have usually included a steel point since the plumb bob is easily dropped and damage to a softer metal such as brass easily occurs. Generally, the steel point is replacable, as is disclosed in the Sireci patent. Most, if not all, plumb bobs utilizing a replacable point such as Sireci require a specific type of point not readily available to the surveyor in the field. Thus, should the instrument man, rod man, or chain man, drop and damage the point to the plumb bob, the surveying work must come to a halt until a replacement point or another plumb bob is obtained. Therefore, in addition to the high visibility of a plumb bob, it is appropriate to provide a plumb bob that includes provision for an easily-obtainable replacable point, should the hardened steel point become damaged or lost.

Plumb bobs such as that disclosed by Sireci ordinarily carry at their upper end some means for affixing the string or flexible member. While Sireci teaches a rotating cap such that the knotted end of the string may be placed through an opening and the cap rotated so that the string is positioned at the center line of the plumb bob, the more common plumb bob utilizes a knurled screwed-on cap having a central bore. Thus, to affix the string to the common plumb bob, the cap is unscrewed, the string threaded through the bore and knotted, and the cap replaced on the plumb bob. While this system has worked with efficiency in the past, it is subject to the loss of the cap upon removal of the cap from the plumb bob. If the cap is lost, for example, in high grass, the surveying work must again come to a halt until the entire plumb bob can be replaced. It should be noted that it is not uncommon for the string to break after prolonged use of the plumb bob.

As previously noted, the supporting string of a conventional plumb bob is threaded through a bore in a removable cap. This cap of the plumb bob is made so that the bore and the outer surface of the plumb bob meet at an angle. This angular junction either abrades the supporting string, causing it to break, or in the extreme cuts the string when tension is placed thereupon. Further, in order to facilitate removal of the cap, the edge thereof is knurled. This knurled edge will also tend to abrade the string, causing early failure. When the surveyor uses a spring-activated surveyor's reel in conjunction with the plumb bob, the reel will retract the string up to the plumb bob. Then the surveyor will place the plumb bob in its sheath so that the reel will hang relatively freely from the top or cap of the plumb bob. As the surveyor moves about the angular edge and the knurl will continuously work on the string until the string finally wears through so that the reel drops off the plumb bob and possibly is lost. Accordingly, this invention has as one of its objects a plumb bob that has a smoothly curved top portion to virtually eliminate abrasion to the supporting string.

Finally, it should be noted that a metallic plumb bob provides a given weight for a given volume, thereby stabilizing the plumb line to the degree desired by the user. (Of course, the heavier the plumb bob is, the more stable it will be in wind conditions.) Since metallic material is relatively dense, it is particularly appropriate for such material to be used in the manufacture of plumb bobs.

The foregoing illustrates limitations of the known prior art. Thus, it is apparent that it would be advantageous to provide alternatives to this prior art. In one aspect of this invention, this is accomplished by providing a plumb bob, having a conical portion and including a knobbed extension. The knobbed extension defines an axial bore and a smoothly curved top portion connecting the outer portion of the extension with the bore.

This plumb bob, which may include a shell made of a high-impact plastic having a high-visibility color, may also permit easy replacement of a pointed member affixed at its smaller end in the field by the use of conventional concrete nails.

The foregoing and other aspects will become apparent from the following detailed description of the invention when considered in conjunction with the accompanying drawings. It is to be especially understood, however, that the drawings are not intended as a definition of the invention, but are for the purpose of illustration only.

BRIEF DESCRIPTION OF THE DRAWINGS

FIG. 1 is an embodiment of the plumb bob described herein in partial section.

FIG. 2 is a detailed view of the plumb bob shown in FIG. 1 showing an alternate collar means.

FIG. 3 is an exploded view of a portion of the plumb bob depicted in FIG. 1 and the collar associated therewith.

FIG. 4 is a view of the plumb bob depicted in FIG. 1 having associated therewith an alternate point.

FIG. 5 is an elevation view of a second embodiment of the plumb bob described herein.

FIG. 6 is a cross-section of the plumb bob illustrated in FIG. 5.

FIG. 7 is a sectional view of the plumb bob illustrated in FIG. 6 taken at line 7—7.

DETAILED DESCRIPTION OF THE FIRST EMBODIMENT

Referring now to FIG. 1, a plumb bob 10 is shown partially in section. Plumb bob 10 has a conical portion and a knobbed extension and is preferably formed of a relatively high-density metallic core 12 surrounded by a relatively low-density frustoconical plastic shell 14. It has been found that a suitable material for shell 14 is polycarbonate, such as one of Lexans manufactured by General Electric Company, Pittsfield, Mass. This material permits outer shell 14 to be dyed with a high visibility color such as international orange.

At the smaller end of shell 14, means are provided for fixing a pointed member to the relatively low-density frustoconical plastic shell 12. Such means include a plastic collar 16 which is formed with a threaded axial bore 18 for receiving a conical point 20. Point 20 is conventional and may be obtained by a user at any surveyor's supply house.

An axial counterbore 22 is formed at the base end of plastic collar 16 and is threaded so that plastic collar 16 may be threadably engaged on a projection 24 unitarily formed on plastic shell 14. The larger or base end 26 of plastic collar 16 may have formed thereon a plurality of radiating projections 28 (see FIG. 3) which, coupled with indentations 30 formed on the lower end 32 of plastic shell 14, form means to lock plastic collar 16 to shell 14.

At the upper end of plumb bob 10, a projecting knob 34 is formed extending outwardly from the base of the frustoconical shape in the manner depicted in FIG. 1. Knob 34 defines an axial bore 36 of somewhat larger diameter than bore 36. The angle of intersection is preferably obtuse as shown in FIG. 1. The surface of knob 34 is smoothly curved at curve 35 into bore 36 so that there is no discontinuity from the interior of bore 36 through curve 35 to the outer surface of knob 34. Bore 36 is to receive a flexible member such as string 40, here shown attached to a target reel 42. String 40 is threaded through bore 36 so that when the string 40 intercepts transverse bore 38, it is fed outwardly to permit a user to form a knot in string 40, as at knot 44, then to retrieve string 40 back through transverse bore 38 so that knot 44 prevents the complete withdrawal of string 40 through bore 36. Thus, plumb bob 10 may be suspended by the flexible member or string 40 along its longitudinal axis.

In order to provide sufficient mass to plumb bob 10, the metallic core 12 is formed of a material such as lead or other relatively high density metal. The core 12 and the shell are both formed with an inwardly extending axial bore 46 which has formed at its lower end a counterbore 48 of sufficient depth to receive a conventional nail head 50 as indicated in FIG. 4.

Counterbore 48 is formed so that a conventional concrete nail 52 may be placed either in the position shown in FIG. 1, that is, retained within the body of the plumb bob with a conventional point 20 affixed to the collar, or extending outwardly through the collar 16 as shown in FIG. 4.

It should be noted that bore 46, in addition to serving as a storage place for concrete nail 52, also serves an additional purpose in the manufacture of plumb bob 10. The metallic core 12 is first cast with the bore 46 formed during the casting process. The outer shell 14 is then formed about the core 12 by an injection molding process. During the injection molding process, the core 12 may be held in the injection mold by a pin extending into bore 46. Once the shell 14 has cooled sufficiently to open the mold, the pin holding the now-relatively solidified shell and core, may be removed.

Referring again to FIG. 1, it can be seen that plastic collar 16 is formed with a transverse bore 54 that facilitates removal of plastic collar 16 from plastic shell 14. Any appropriate pin or nail may be inserted through bore 54 to rotate plastic collar 16 relative shell 14.

Alternatively, as shown in FIG. 2, plastic collar 16' may be formed with parallel flat surfaces 56 (one shown) so that an adjustable wrench may be used in a conventional manner to remove plastic collar 16' from shell 14.

When using a conventional point 20, a similar bore 56 located in point 20 may also be used to remove collar 16 from shell 14 or point 20 from collar 16. Finally, it should be understood that, while this description has been directed toward a plastic/metal combination, the features described herein can be adapted to a solid metal plumb bob.

DETAILED DESCRIPTION OF THE SECOND EMBODIMENT

While the first embodiment illustrates the concept of this invention, it is somewhat difficult to manufacture in plastic as the metal core must be heated to the molding temperature of the surrounding plastic. As a consequence a second embodiment was developed that retains the plastic outer shell and the smooth knobbed extension yet overcomes the problems associated with molding.

Referring now to FIG. 6, a plumb bob 110 is shown in section. Plumb bob 110 is substantially the same as the just described plumb bob 10. Accordingly, similar numbers will be used for similar parts except that in this embodiment the numbers will be in the 100 series. Plumb bob 110 uses a similar relatively high density metallic core 112. In this embodiment the plastic shell 114 is assembled from three parts, the conical shell 114a, the bonnet 114b and the knob 114c. As can be seen the metallic core can be inserted in the conical shell 114a and the bonnet 114b bonded thereto by any convenient method so that the joint 115 is fuzed. This may be accomplished by sonic welding or with a solvent type glue.

Knob 114c is similarly fuzed to bonnet 114b. As can be seen in FIG. 5 the assembled plumb bob 110 appears substantially the same as plumb bob 10. Knob 114c is formed with an axial bore 136. With knob 114c fuzed to bonnet 114b, a transverse hole 138 is formed that intersects axial bore 136. Knob 114c is smoothly curved at curve 135 so that a string (not shown) is not abraded by a sharp edge. As with the first embodiment knob 114c is not knurled. The supporting string (not shown) is threaded through bore 136 and out of hole 138 so that the end of the string may be knotted as shown in FIG. 1.

It should be understood that bonnet 114b is formed with an upstanding collar 170 while knob 114c is formed with a mating groove 172. At the position of hole 138 collar 170 is interrupted at 174 as shown in FIG. 6. Groove 172 may or may not be interrupted to mate with interruption 174 in collar 170. If groove 172 is interrupted assembly of the plumb bob is facilitated as it then becomes trivial to align the two parts.

As its other end plumb bob 110 has a collar 116 which is preferably made of metal but may be made of plastic in the manner of collar 16. Collar 116 is threadably affixed to a plug 117 which is also made of metal. Plug 117 is knurled at one end and force fitted into an axial counterbore 119 of shell 114a. Plug 117 is threaded at 122 to receive collar 116. Collar 116 is formed with a transverse bore 154 which may be used to assist in removing or installing collar 116. While bore 54 in the first embodiment is slightly off center, this is not necessary nor desireable in the heavier and stronger metal collar 116. Collar 116, plug 117, shell 114a and metallic core 112 define a coaxial bore 146 which may be used to store a nail 152 as in the earlier embodiment.

Finally a conventional point 120 is threadably fixed to collar 116 in the same manner as the first embodiment.

While this second embodiment differs in construction from the first embodiment, the only noticeable outward difference is collar 116 preferably being of metal instead of plastic. It should also be understood that just as in the first embodiment the inventive plumb bob can be of metal, however, in order to accomplish the desiderata, the knobbed top 114c must have a smoothly curved outer surface that curves into bore 136 as at 135. Also desirable is the storage for a supplemental point 152 that may be inserted and used in lieu of point 20.

Industrial Applicability

With the parts assembled as set forth above, the plumb bob operates in the normal manner well known in the art. Such a description of the use of the plumb bob is not necessary at this point, as those skilled in the art are well aware of the use of a plumb bob in its assembled form.

Nevertheless, it is appropriate to point out the use of the plumb bob with its particular features. In particular, the flexible member of string 40, which may be combined with a surveyor's reel 42 such as described in U.S. Pat. No. 3,172,205 issued Mar. 9, 1965 to Norman Gammon, the inventor herein, is fed through bore 36 such that it extends outwardly of transverse bore 38 to permit knot 44 to be made. While the curve 35 found on knob 34 is clearly an improvement over the caps found on conventional plumb bobs because it reduces abrasion to string 40, it is particularly appropriate when the plumb bob is used in combination with the aforesaid surveyor's reel as the string 40 is not abraded by either the knurled edge of the conventional cap or the sharp angle normally found between the analogous bore and outer surface of the cap. Furthermore, curve 35 makes threading of string 40 into bore 36 a relatively simple task.

Under normal circumstances, the collar 16 is fitted with a conventional point 20 such that collar 20 is screwed onto the threaded projection 22 of shell 14. Inserted in bore 46 is a conventional concrete nail 52 in the manner shown in FIG. 1.

Should the point 20 become damaged or lost, the collar 16 is removed and the nail 52 reversed, as shown in FIG. 4, so that the point of nail 22 replaces the point 20 in the use of the plumb bob. The plastic shell 14, which is made of a high-impact plastic, also is formed of a high-visibility material so that the plumb bob itself is readily sighted by the surveyor in his use in the field.

The second embodiment is used in the same manner as the first embodiment and thus will not be described in detail.

While the present invention has been described in reference to a preferred embodiment, it will be understood by those skilled in the art that various changes may be made and equivalents substituted for elements thereof without departing from the scope of the invention. In addition, many modifications may be made to adapt a particular situation or material to the teachings of this invention without departing from the scope thereof. Therefore, it is intended that the invention not be limited to the particular embodiment disclosed, but the invention will include all embodiments falling within the scope of the appended claims.

I claim:

1. A plumb bob which comprises;
   a relatively high-density metallic core;
   a relatively low-density frustoconical plastic shell defining an axis and surrounding said metallic core;
   means for affixing a pointed member to said relatively low-density frustoconical plastic shell at the smaller end thereof and coincident with said axis;
   said plastic shell having a continuous smooth surfaced knobbed extension at its larger end adapted to receive a flexible support member on said axis.

2. The plumb bob of claim 1 wherein the means for affixing a pointed end includes a conical support collar, said support collar defining a first axially threaded bore.

3. The plumb bob of claim 2 wherein the conical support collar defines a second axially threaded counterbore.

4. The plumb bob of claim 3 wherein the relatively low-density frustoconical plastic shell defines at its smaller end a threaded boss adapted to receive the second axially threaded counterbore of the conical support collar.

5. The plumb bob of claim 4 wherein the frustoconical plastic shell defines a shoulder at its smaller end adjacent the threaded boss and further wherein the support collar includes a flat surface at its larger end;
   said flat surface forming a mating surface with said shoulder and with said shoulder defining means for resisting relative rotation of said support collar relative said shell.

6. The plumb bob of claim 1 wherein said plastic shell is comprised of an opaque polycarbonate.

7. The plumb bob of claim 6 wherein said plastic shell is a high visibility color.

8. The plumb bob of claim 1 wherein the shell and the metallic core define an axial bore.

9. The plumb bob of claim 1 wherein the knobbed extension defines an axial bore and further defines a lateral bore intersecting said axial bore, said knobbed extension further defining a continuous smoothly curved top portion connecting the outer surface of said extension and said bore;

said lateral bore having a larger diameter than said axial bore.

10. In combination with a surveyor's reel a plumb bob comprising:

a relatively high-density metallic core;

a relatively low-density frustoconical plastic shell defining an axis and surrounding said metallic core;

means for affixing a pointed member to said relatively low-density frustoconical plastic shell at the smaller end thereof, coincident with said axis; and said plastic shell formed with a continuous smooth surfaced knobbed extension at its larger end, said extension adapted to receive a flexible support member on said axis.

11. The plumb bob of claim 10 wherein the means for affixing said pointed end includes a conical support collar, said support collar defining a first axially threaded bore.

12. The plumb bob of claim 10 wherein said plastic shell is comprised of an opaque polycarbonate.

13. The plumb bob of claim 12 wherein said plastic shell is a high visibility color.

14. The plumb bob of claim 10 wherein the knobbed extension defines an axial bore and further defines a lateral bore intersecting said axial bore, said knobbed extension further defining a continuous smoothly curved top portion connecting the outer surface of said extension and said bore.

15. A plumb bob which comprises:
a conical portion and
a knobbed extension at the larger end of said conical portion, said knobbed extension defining an axial bore and a continuous smoothly curved top portion connecting the outer surface of said extension and said bore.

16. The plumb bob of claim 15 wherein the conical portion comprises:

a frustoconical body defining an axis;

means for affixing a pointed member to said body at the smaller end thereof and coincident with said axis.

17. The plumb bob of claim 16 wherein said knobbed extension further defines a lateral bore intersecting said axial bore.

18. The plumb bob of claim 17 wherein said frustoconical body includes a relatively high-density metallic core and a relatively low-density frustoconical shell surrounding said metallic core.

19. The plumb bob of claim 15 wherein said knobbed extension further defines a lateral bore intersecting said axial bore.

20. The plumb bob of claim 19 wherein said lateral bore intersects said axial bore at an obtuse angle.

21. In combination with a surveyor's reel a plumb bob comprising:

a conical portion and a knobbed extension at the larger end of said conical portion, said knobbed extension defining an axial bore and a continuous smoothly curved top portion connecting the outer surface of said extension and said bore.

* * * * *